Sept. 28, 1965  C. W. RANSON  3,208,732
FRUIT AND VEGETABLE WASHING DEVICE WITH
VERTICAL CIRCULATIVE FLOW AND
PERFORATED COVER
Filed Dec. 24, 1962
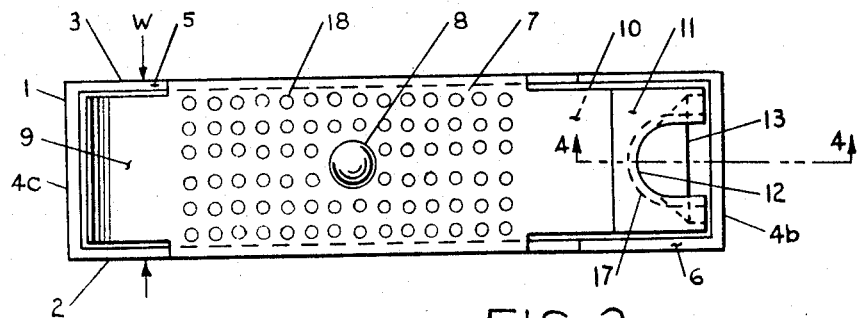
FIG. 2
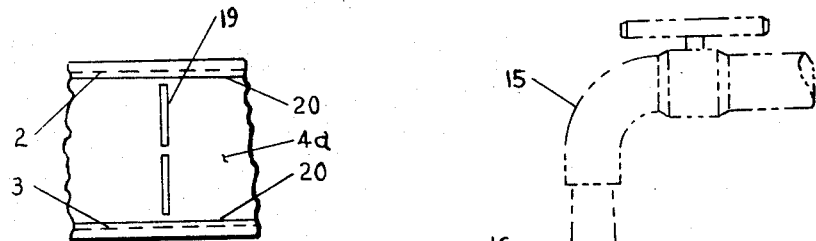
FIG 3
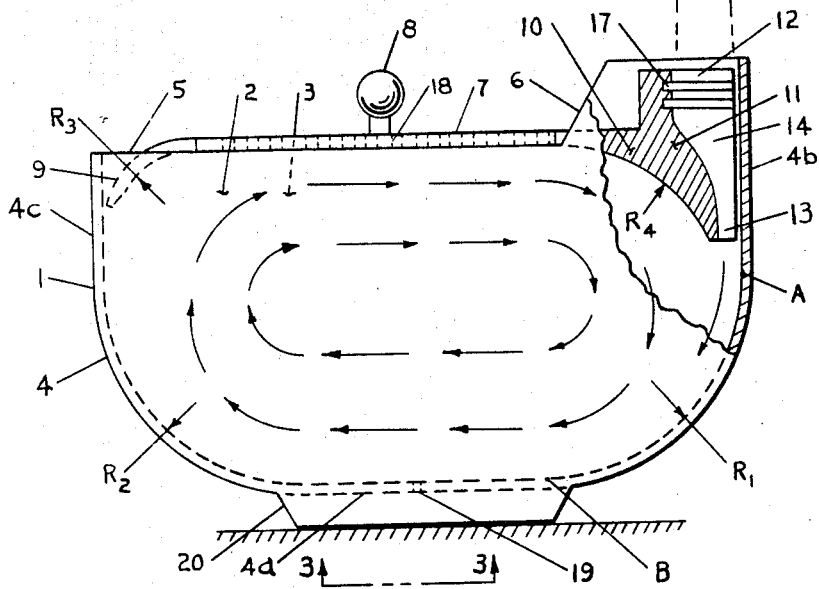
FIG I ND# United States Patent Office 3,208,732
Patented Sept. 28, 1965

3,208,732
FRUIT AND VEGETABLE WASHING DEVICE WITH VERTICAL CIRCULATIVE FLOW AND PERFORATED COVER
Charles W. Ranson, 7906 Agnew Ave., Los Angeles, Calif.
Filed Dec. 24, 1962, Ser. No. 246,715
11 Claims. (Cl. 259—4)

The present invention relates to a washing device for fruits, vegetables, and other solid food units. The device provides for imparting to contained liquid a two dimensional circulative flow in a vertical plane. Provision is included for the circulative liquid flow to receive sufficient kinetic energy from tangential inlet liquid flow to effect continuous vertical circulative motion of the fruits or vegetables.

Objects of the invention are to provide for the thorough cleaning of all surface areas of fruits and vegetables in minimum time and without bruises or damage.

Other objects are to provide a simple cleaning device having no moving mechanical parts, and which can be used conveniently in household kitchen sinks, and which can utilize kinetic energy available from conventional household faucet water.

Another object is to prevent the loss overboard of circulating food units during copious overflow of exhaust liquid.

Another object is to provide an ample number of small exhaust ports to block the egress of small berries and to establish low liquid escape velocities through the ports such that the liquid pressure at the ports is insufficient to grip the berries to the ports and block the liquid escape.

Another object is to utilize the net gravitational weight of semi-buoyed food units to assist in causing separation of small berries and the like from small vertical exhaust ports to prevent continued port blockage.

Another object is to provide minimum back pressure from the overflow ports to provide maximum liquid flow efficiency.

Another object is to provide a high rate of dilution of impurities by a high exhaust overflow rate.

Another object is to reduce the jamming or stalling tendency of large loads of circulating food units.

Another object is to provide maximum liquid circulative flow efficiency.

A number of other objects and advantages will become apparent as the description proceeds.

One form of the present invention is illustrated in the accompanying drawings wherein similar numerals refer to similar parts throughout the views.

FIGURE 1 is a side view of the fruit and vegetable washing device properly positioned beneath an open water faucet. The arrows indicate the flow path of the circulative liquid flow. The broken section of FIGURE 1 is a view along line 4—4 of FIGURE 2.

FIGURE 2 is a plan view of FIGURE 1 showing the comparatively narrow width of the washing device.

FIGURE 3 is a fragmentary view along line 3—3 of FIGURE 1 showing auxiliary exhaust ports in the bottom wall of the device.

The washing of fruits and vegetables in the kitchen has heretofore been accomplished by the use of a colander, a conventional kitchen pan, or by hand rubbing under an open faucet.

The colander is a bowl shaped sieve with a base. For food washing purposes, the colander is held under an open faucet while containing a pile of food units. The bulk of the water follows the path of least resistance and flows around rather than through the pile of food units. The velocity of the water seeping between the food units is low due to resistance so that liquid scouring and dissolving action is relatively inefficient and slow. Also the food units lie static so that areas of mutual contact and areas of contact with the container receive no washing.

The conventional kitchen pan is generally used for washing by filling the bottom of the pan with food units and most of the remainder with water. The pan is then shaken by hand to simulate the action of a tumbling barrel. The cleaning action is highly erratic and inconsistent. Rinsing is only partial as the liquid is poured out. Bruises and surface damage can be done to berries and delicate skin fruits by the shifting weight of the total load.

The prior art has also provided a washing device of the type described herein. This device is described in my copending application of Serial No. 465,822 effective filing date December 3, 1962. Said prior device is generally similar to the device presently illustrated by FIGURES 1 and 2 except that the prior device was operated without a cover member. Since continuous liquid inflow and outflow is required for operation, the prior device was initially provided with a short length, low cut spout or weir for liquid outflow. However, overflow losses of food units was prohibitively large with this configuration. A similar weir but with a screen-like cover prevented food unit overflow but resulted in food unit blockage of the weir and malfunction of the device. However, satisfactory performance for most varieties and sizes of food units was obtained by utilizing the relatively long horizontal edge of an open top container portion as an overflow weir. The weir cover member was simply omitted. The overflow rate per unit length was low due to the long weir length. Also the height of the elongated overflow liquid stream was low due to the long weir length. This resulted in greatly reduced overflow losses of food units. However with subsequent increases in wash load capacity of the device due to design improvements the amount of overboard losses has increased because of mutual food unit crowding. Also, while most varieties of food units can be accommodated satisfactorily it has been found that food units which are of small size or more buoyant than most are sometimes subject to troublesome overflow losses. These food units must then be gathered up and replaced in the washing device for cleaning. Consequently, it is a purpose of this invention to provide an overflow port wherein a screen-like retention of food units is obtained but without blockage of the overflow port by the food units.

The present invention improves upon the prior devices and provides advantages as set forth by the above statements of objectives.

Referring to the several figures, washing device 1 is comprised of side walls 2 and 3 extending longitudinally and vertically and spaced apart in relative proximity. A lateral wall 4 extends between side walls 2 and 3 to provide a bottom wall 4a and two opposite end walls 4b and 4c. The bottom wall 4a and end wall 4b are faired together by radius $R_1$ to provide a curved inner surface, as shown.

The inner surface of end wall 4b extends vertically above point A, which is the point of tangency with radius $R_1$. Point B indicates the lower point of tangency with radius $R_1$. Bottom wall 4a and end wall 4c are faired together by radius $R_2$. The internal surface of lateral wall 4 provides a smooth, curved perimeter flow path for contained liquid.

The washing device has a large upper perimeter 5 which includes a spout portion 6. This provides an open top cotainer construction. The open top is covered by lid 7. Lid 7 includes a lifting knob 8, and guide vane portions 9 and 10 at opposite ends. Curvature or slant of guide vane portion 9 is indicated by radius $R_3$ and that of guide van portion 10 by radius $R_4$. These vane portions provide for optimum liquid flow patterns with reduced kinetic energy losses and eliminate the jamming tendency of food units at turns.

Lid 7 includes a liquid inlet portion 11 which is partially integral with guide vane portion 10. Inlet portion 11 includes an upper admission port portion 12, a normally submerged exit port portion 13, and an interconnecting vertical duct portion 14. The duct portions are adjacent to end wall 4b so that the end wall cooperates to provide a portion of the ducting wall.

For operation, the device is partially filled with fruits or vegetables or other food units and placed under an open faucet 15. Device 1 is positioned so the water jet enters admission port portion 12. The water preferably enters as a free jet 16 as shown in FIGURE 1. As an option, not shown, an elastic extension conduit may be inserted in admission port portion 12 to be gripped by annular grooves 17 of inlet portion 11. The other end of the conduit may be adapted to fit snugly over the outside diameter of the nozzle of faucet 15. This optional installation is desirable where water pressure is low but has the disadvantage of being less convenient and more costly.

Water jet 16 passes through inlet portion 11 and is ejected at exit port portion 13 entering the container portion of the washing device. The waterjet enters adjacent to end wall 4b, passes tangent point A and is guided by the surface at $R_1$ into a circulative path. The liquid is further directed into a circulative path by the surfaces at $R_2$ and $R_3$ as well as the slanted or curved surface of radius $R_4$ of the inlet portion. The established flow path is in accordance with the arrows shown in FIGURE 1. The liquid major exhaust occurs through the many small holes 18 through lid 7. Auxiliary exhaust ports 19 in bottom lateral side wall 4a provide for the continuous exhausting of small liquid jets to eject sand and other solid particles.

Washing device 1 contains liquid vertically within a width, W of relatively narrow proportions as shown in FIGURE 2. This lateral confinement provides for two dimensional liquid flow in a vertical plane. The circulative flow pattern is induced by the tangential inlet jet and curved inner surfaces of the lateral side wall, FIGURE 1. Two dimensional confinement contributes greatly to liquid flow control and reduces dissipation of kinetic energy from lateral flow and turbulence.

As stated above, the side walls 2 and 3 are in the state of being mutually near. This side wall proximity endows the washing device with a width less than the length or height of each. The device has ben found to be operable using conventional household faucets and a reasonable container volume when width W is about one half or less of the length or height of the device. As the width of the device is decreased with respect to the length or height, the efficiency and load capacity increase. When the width of the device is relatively large with respect to the length or height the circulative two dimensional flow pattern is not obtained, but localized random liquid agitation occurs at the region of faucet water entry. This results in erratic and negligible washing action. The specific side wall proximity required for satisfactory performance of any given installation depends upon a number of variables including the liquid mass flow rate, the height and length of the device, the internal contours of the device, the densities and dimensions of the food units to be cleaned, and the size of the wash load.

The kinetic energy of the inlet jet is conserved by the relatively large proportions of radii $R_1$, $R_2$, $R_3$ and $R_4$, and by the substantially two dimensional liquid flow pattern. The overflow liquid is of low velocity and low kinetic energy loss. Viscosity functions to maintain the entire liquid body in a state of circulative flow.

The two dimensional circulative liquid flow in a vertical plane imparts similar circulative motion to contained food units. The submerged food units are buoyed by forces equal to the weights of the displaced liquid. Consequently, only a relatively small amount of liquid drag force is required to lift a given food unit vertically against the gravity force. The drag force of a solid body in non-laminar liquid flow is proportional to the relative velocity squared. Hence, by constructing washing device 1 as described, to conserve kinetic energy and to maintain high liquid rotative velocity, the food units are forced to rise and circulate with the liquid. Food unit circulative washing has been achieved using the water jet from conventional household faucets. It was found that the food units experience local tumbling as they move in general circulative flow. This tumbling action adds to the liquid scouring effect and to the cleaning by mutual attrition between food units.

During operation of the washing device, insecticides, fungicides and other chemicals and soil particles are progressively removed from food units by a continuously diluting liquid flow. The impurities are carried away in the bulk liquid overflow through the numerous small transverse holes 18 in lid 7. The numerous holes provide a relatively large total overflow area with a small liquid overflow rate per unit area. This low overflow rate corresponds to a small differential liquid pressure across the small holes. This small pressure has been found in tests to be insufficient to grip small, lightweight berries to holes in horizontally disposed lids. Consequently, the overflow holes do not become clogged with food units and the device continues to operate normally. The device does not clog or stall. Small berries are not swept overboard due to the obstruction of lid 7 which contains holes 18 smaller than the food units.

Heavier nonsoluble impurities are discharged through auxiliary exhaust ports 19 as the impurities are swept by the liquid along the surface of bottom wall 4a. Ports 19, by the removal of the liquid boundary layer, retard the formation of major turbulence, and therefore improve efficiency by conserving kinetic energy of the main liquid flow. When faucet 15 is closed, drainage occurs automatically through ports 19 permitting food units conveniently to be poured from spout 6 without liquid.

Upper admission port portion 12 extends upwardly to provide an anti-splash chamber. The inlet port and annular grooves 17 function to trap splashing water. Admission port portion 12 is shaped to receive a circular water jet or a circular conduit. Exit port portion 13 is of elongated cross sections to provide improved performance as has been demonstrated by tests. Duct portion 14 provides a gradual transition in cross sectional shapes from circular to elongated.

Inlet portion 11 may be separable from lid 7 or the inlet portion may be bonded or otherwise integrally associated with the lid or the washing device container portion within the scope of the invention. Similarly, the inlet portion may be separable into sections which combine in use to perform as described.

The washing device rests on parallel skids 20 to provide elevation clearance from liquid jets from auxiliary exhaust ports 19.

While one embodiment of the present invention has been illustrated it is to be understood that what is defined by Letters Patent is specified by the appended claims.

What is claimed is:

1. A washing device including two side walls extending longitudinally and vertically and spaced apart in relative proximity, a lateral wall extending between said side walls to provide a bottom wall and two opposite end walls and connecting with said side walls in unitary relation to provide a container cavity, and the inner surface of said bottom wall and the inner surface of at least one of said end walls substantially faired to provide a substantially curved inner surface at the region of juncture and said spaced side walls separated a distance less than one half of the largest single dimension of the container cavity in the direction of length or height, and said walls terminating upwardly to provide an overflow port, and a substantially rectangular or elongated cover member for said overflow port, and said cover member provided with a plurality of small apertures.

2. A washing device and cover member as in claim 1, and the inner surface of at least one end of said cover member slanted downwardly to normally guide contained liquid in a curved path.

3. A washing device and cover member as in claim 1, and the inner surfaces of two opposite ends of said cover member slanted downwardly to normally guide contained liquid in a curved path.

4. A washing device including two side walls extending longitudinally and vertically and spaced apart in relative proximity, a lateral wall extending between said side walls to provide a bottom wall and two opposite end walls and connecting with said side walls in unitary relation to provide a container cavity, and the inner surface of said bottom wall and the inner surface of at least one end walls substantially faired to provide a substantially curved inner surface at the region of juncture and said spaced side walls separated a distance less than one half of the largest single dimension of the container cavity in the direction of length or height, and said walls terminating upwardly to provide an overflow port, and a substantially rectangular or elongated cover member for said overflow port, and said cover member provided with a plurality of small apertures, and at least one end of said cover member providing a liquid inlet portion, said inlet portion including an upper admission port portion and a lower normally submerged exit port portion and an interconnecting duct portion.

5. A washing device and cover member as in claim 4, and said end wall cooperating with said duct portion of said inlet portion to provide an integral duct.

6. A washing device including two side walls extending longitudinally and vertically and spaced apart in relative proximity, a lateral wall extending betwen said side walls to provide a bottom wall and two opposite end walls and connecting with said side walls in unitary relation to provide a container cavity, and the inner surface of said bottom wall and the inner surface of at least one of said end walls substantially faired to provide a substantially curved inner surface at the region of juncture and said spaced side walls separated a distance less than one half of the largest single dimension of the container cavity in the direction of length or height, and said walls terminating upwardly in a horizontal plane generally to provide a substantially horizontally disposed overflow port and a substantially rectangular or elongated cover member for said overflow port, and said cover member provided with a plurality of small apertures.

7. A washing device including two side walls extending longitudinally and vertically and spaced apart in relative proximity, a lateral wall extending between said side walls to provide a bottom wall and two opposite end walls and connecting with said side walls in unitary relation to provide a container cavity, and the inner surface of said bottom wall and the inner surface of at least one of said end walls substantially faired jointly to provide a substantially curved inner surface at the region of juncture, and said walls terminating upwardly to provide an overflow port, and a substantially rectangular or elongated cover member for said overflow port, and said cover member provided with a plurality of small apertures, and a liquid inlet portion, said inlet portion including an upper admission port portion open upwardly to the atmosphere and a lower normally submerged exit port portion and an interconnecting duct portion.

8. A washing device and cover member as in claim 7, and said exit port portion of the inlet portion at the final discharge section having an elongated transverse cross section.

9. A washing device and cover member as in claim 7, and said upper port and duct portions of said inlet portion having enlarged cross sectional areas upwardly to provide an anti-splash chamber.

10. A washing device including two side walls extending longitudinally and vertically and spaced apart in relative proximity, a lateral wall extending between said side walls to provide a bottom wall and two opposite end walls and connecting with said side walls in unitary relation to provide a container cavity, and the inner surface of said bottom wall and the inner surface of at least one of said end walls substantially faired to provide a substantially curved inner surface at the region of juncture, and said side walls separated a distance less than one half of the largest single dimension of the container cavity in the direction of length or height, and said walls terminating upwardly to provide an overflow port, and a substantially rectangular or elongated cover member for said overflow port, and the center portion of said cover member sufficiently wide to seat on said side walls, and at least one end of said cover member relatively narrow to not seat on said side walls, and said cover member provided with a plurality of small apertures.

11. A washing device and cover member as in claim 1, and said cover member sufficiently wide in planform at center regions to be supported on said side walls and relatively narrow in planform at opposite ends, and said opposite ends slanted downwardly to provide liquid turning vanes during normal operation, and a liquid inlet unit associated with one of said relatively narrow end portions, and said inlet portion including an upper admission port portion and a lower normally submerged exit port portion, and an interconnecting duct portion.

References Cited by the Examiner

UNITED STATES PATENTS

| | | | |
|---|---|---|---|
| 577,362 | 2/97 | Ettlinger | 239—592 X |
| 1,245,768 | 11/17 | Randall | 259—36 |
| 1,437,713 | 12/22 | Boddy | 68—196 |
| 1,663,382 | 3/28 | Merkel | 251—118 X |
| 2,254,003 | 8/41 | De Marco | 68—196 |
| 2,502,965 | 4/50 | Knapp | 68—196 X |
| 2,632,323 | 3/53 | Merriman | 68—196 X |
| 2,964,047 | 12/60 | Jackson | 68—196 X |

FOREIGN PATENTS

| | | |
|---|---|---|
| 627,061 | 7/49 | Great Britain. |
| 587,859 | 1/59 | Italy. |

CHARLES A. WILLMUTH, *Primary Examiner.*

GEORGE J. NORTH, *Examiner.*